United States Patent [19]

Riediger et al.

[11] Patent Number: 4,541,497

[45] Date of Patent: Sep. 17, 1985

[54] CONTROL MECHANISM FOR OPERATING A TRACTOR

[75] Inventors: Craig W. Riediger, Pekin; Ervin E. Mangus, Brimfield; Gerald P. Simmons, Washington, all of Ill.; Anthony J. Knock, Davenport, Iowa

[73] Assignee: Caterpillar Tractor Co., Peoria, Ill.

[21] Appl. No.: 619,168

[22] Filed: Sep. 13, 1982

[51] Int. Cl.⁴ .................. B62D 11/04; G05G 9/00
[52] U.S. Cl. .................. 180/6.48; 74/471 R; 180/333
[58] Field of Search ............ 180/6.48, 6.66, 315, 180/332, 333; 74/471 R

[56] References Cited

U.S. PATENT DOCUMENTS

| | | | |
|---|---|---|---|
| 1,928,915 | 10/1933 | Stout | 180/77 |
| 2,393,324 | 1/1946 | Joy | 180/17 |
| 2,730,182 | 1/1956 | Sloane | 180/6.66 |
| 2,941,609 | 6/1960 | Bowers et al. | 180/6.48 |
| 3,024,858 | 3/1962 | Davis et al. | 180/6.48 |
| 3,181,389 | 5/1965 | Richard | 74/480 |
| 3,354,981 | 11/1967 | Swanson et al. | 180/333 |
| 3,369,419 | 2/1968 | Henstrom et al. | 74/720.5 |
| 3,385,387 | 5/1968 | McKeown | 74/471 |
| 3,417,635 | 12/1968 | Day et al. | 74/484 |
| 3,540,220 | 11/1970 | Lauck | 180/6.48 |
| 3,620,096 | 11/1971 | Scolari | 180/6.48 |
| 3,891,042 | 6/1975 | Braun | 180/6.48 |
| 4,111,066 | 9/1978 | Kendrick | 74/471 R |

Primary Examiner—Joseph F. Peters, Jr.
Assistant Examiner—Donn McGiehan
Attorney, Agent, or Firm—Charles E. Lanchantin, Jr.

[57] ABSTRACT

A control mechanism (14) associated with a tractor operators seat (110) and an arm rest (112) is disclosed which includes a steering selector apparatus (116) having an upstanding member (134) and a tiller arm (118) extending outwardly therefrom. The tiller arm (118) is advantageously located immediately forwardly of the arm rest (112) and has a mounting portion (142) and hand grip portion (144) that can be easily grasped by an operator's downwardly facing hand palm. A support assembly (136) pivotally supports the upstanding member (134) for movement about a fixed upstanding axis (140) and a control device (46,50,52,54,184) steers the tractor in response to the swinging movement of the tiller arm (118). In response to rotation of the hand grip portion (144) about the axis (158) of the tiller arm (118) a second control device (38,42,174) effects a change in the gear condition of an associated transmission (36).

36 Claims, 11 Drawing Figures

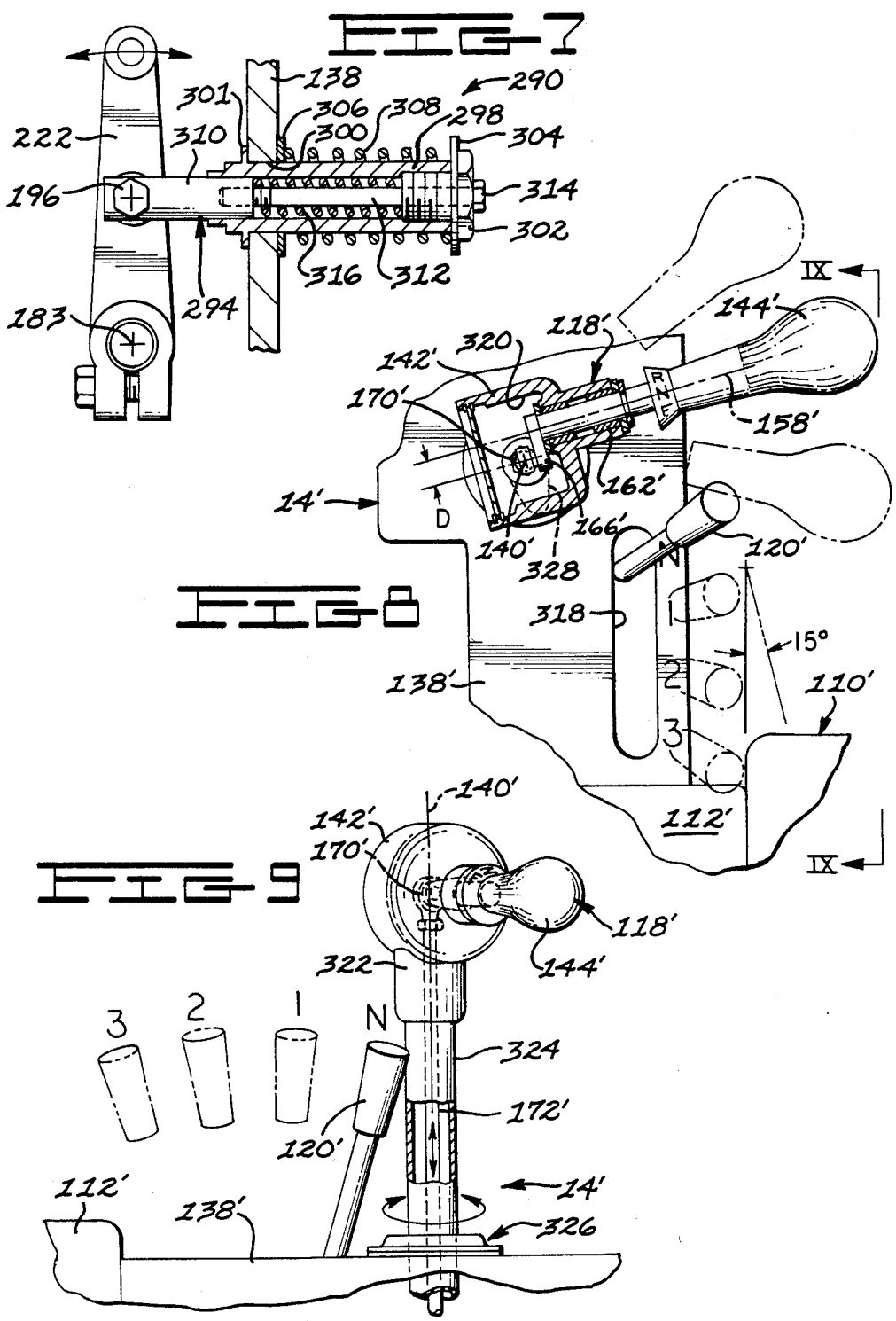

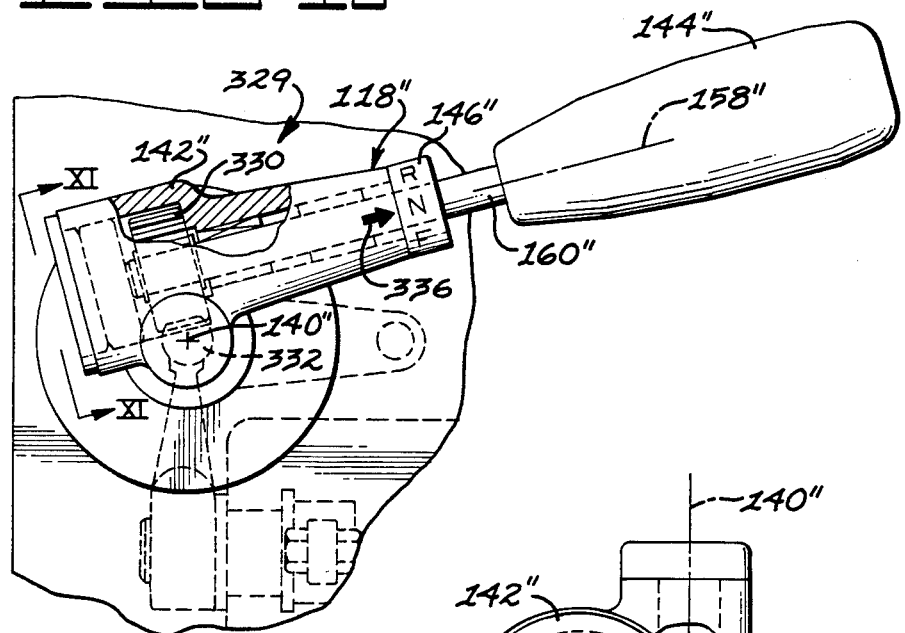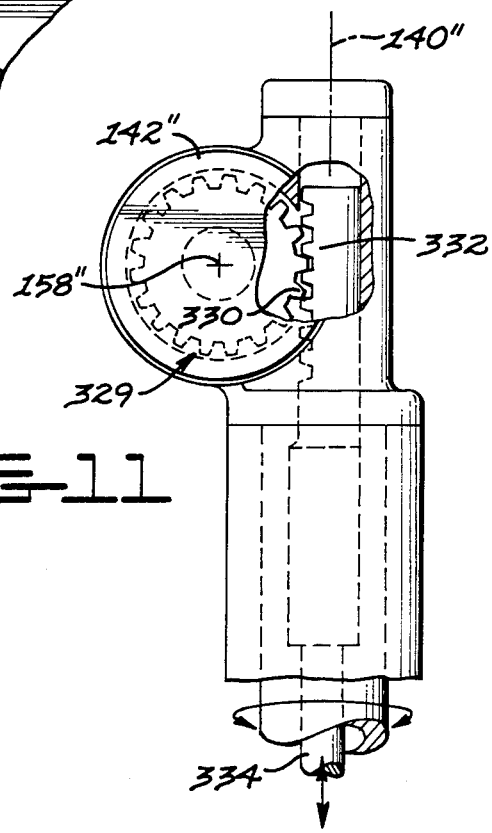

CONTROL MECHANISM FOR OPERATING A TRACTOR

DESCRIPTION

1. Technical Field

This invention relates to a mechanism for controlling the movement of a tractor, and more particularly to a more effective and operationally less fatiguing mechanism for steering the tractor.

2. Background Art

It has long been known to operate left and right hand operated steering levers for disengaging the clutches located at either side of a crawler tractor and making slight steering corrections. This results in an interruption of full power to one side and can be accompanied by the engagement of a foot operated service brake pedal at the disengaged side in order to make a larger steering correction or tighter turn. Since the drive to the inside track chain is interrupted during a turn, a loss in the drawbar pull and/or the productivity of the tractor can result.

In the system mentioned immediately above, the frequent manipulation of two steering levers and two brake pedals causes considerable operator fatigue, and more recently these functions have been combined. Specifically, the depression of one foot pedal or the retraction of one hand lever in the modified embodiment can sequentially disengage the clutch and then apply the brake at one side of the tractor for steering it. This, of course, reduces the number of members to control the steering from four to two and is of appreciable benefit.

Positive power flow from the engine to both of the track chains during a steering correction is provided by some tractor manufacturers. Usually this is achieved by incorporating separate hydrostatic pump and motor systems for each side of the tractor. Each traction motor is normally operated by a separate control lever. Thus, when the two control levers are moved together in lateral alignment the hydrostatic traction motors operate together at the same desired speed for straight line tractor movement in either the forward or reverse direction. When the control levers are individually manipulated, differential rotation of the traction motors occurs and the tractor makes a turn.

Most tractors are equipped with an auxiliary implement such as a bulldozer blade, a ripper or the like and, accordingly, one of the operators hands is often on the implement control lever. The implement control lever can be of the "joy-stick" type wherein a single lever can be moved longitudinally for one function, laterally for another, and diagonally from a central position to provide dual changes in the physical disposition of the implement. This added complexity of motion takes a considerable amount of manual effort and operator attention, and usually is limited to the operator's right hand. When one realizes that the operator must also simultaneously manipulate other controls on the tractor, such as the engine throttle and/or decelerator, the transmission selector lever, and the service brakes, the operational complexity becomes apparent.

One known "joy-stick" control incorporates a single lever movable longitudinally for forward and reverse travel of the tractor, and movable laterally with respect to the operator seat for differentially operating the left and right traction motors and effecting a steering correction. Since the operator's right hand is frequently manipulating the implement control lever, there is undue complexity and confusion in operating such a "joy-stick" simultaneously with his left hand. The diagonal movement thereof is particularly vexatious and consumes an excessive amount of effort.

Another modified form of "joy-stick" incorporates an upstanding T-shaped handle which is rotated about a laterally extending horizontal axis to control a pair of pump and traction motors for straight line motion of the tractor in the forward and reverse directions. In addition, the T-shaped handle can be rotated about its own generally upstanding axis so as to achieve a right turn or a left turn by differential operation of the traction motors. But, because of the physical disposition of the operator's hand palm substantially over the top of the T-shaped handle the tractor operator can quickly become fatigued. It can easily be appreciated that the twisting movement required to make a steering correction with a T-shaped handle is unnatural when one considers the longitudinal orientation of the operator's forearm and wrist when the operator is seated, and the poor mechanical moment arm of the T-shaped handle.

Accordingly, what is needed is an improved control mechanism for steering a tractor which will have a control element so constructed as to fully take into account the principles of motion economy and which control element will be effective to operate an associated control system. Preferably, other auxiliary tractor movement control functions such as the speed and directional control of the transmission of the tractor should be integrated into the control mechanism so that the operator can make extensive use of natural rhythmic motions in the manipulation of the various control elements using a single hand. In addition to reducing operator fatigue, the mechanism should be simple and yet rugged so that it will perform the desired services economically.

The present invention is directed to one or more of the problems as set forth above.

DISCLOSURE OF THE INVENTION

In one aspect of the invention a control mechanism for a tractor having a housing and an operators seat having an arm rest includes a novel steering selector apparatus having an upstanding member and a tiller arm connected to and extending outwardly from the upstanding member. The tiller arm is disposed generally immediately forwardly of the arm rest and has a mounting portion and a hand grip portion of a width sufficient for being conveniently grasped by an operator's downwardly facing hand palm. A support assembly connects the upstanding member to the housing so that it can rotate about a fixed upstanding axis, and a control device steers the tractor in response to the swinging movement of the tiller arm from a central position to a forward position steering the tractor in one direction and to a rearward position steering the tractor in the other direction.

In another aspect of the invention a control mechanism is provided for a tractor including a transmission having a plurality of gear conditions. A steering selector apparatus includes a tiller arm having a mounting portion and a hand grip portion, and is mounted on the tractor in such a manner that the tiller arm is swingable about a fixed upstanding axis. Desirably, a first control device is effective to steer the tractor in response to swinging movement of the tiller arm about the axis in either direction away from a central position, and a second control device is effective to change the gear condition of the transmission in response to rotational movement of the hand grip portion on the mounting portion of the tiller arm.

In still another aspect of the invention a control mechanism has a steering member mounted on the tractor for swinging movement about a fixed upstanding axis and a twist grip member for changing the travel direction of the tractor in response to rotational movement thereof on the steering member.

More specifically, a hand grip portion of the steering tiller arm is rotatable about the outstanding axis of the tiller arm for changing the travel direction of the tractor. The hand grip portion is preferably located in a preselected spot forwardly and slightly above the elevation of the left arm rest of the tractor seat. A speed selector lever is so mounted on a housing that it extends upwardly adjacent the steering tiller arm in such a manner that the tractor operator can quickly and effectively make a speed change before returning his left hand to its relatively relaxed position of grasping the hand grip portion of the tiller arm.

Other objects and advantages of the present invention will become readily apparent upon reference to the accompanying drawings and following description.

BRIEF DESCRIPTION OF THE DRAWINGS

FIG. 7 is a diagrammatic, sectionalized view of a centering mechanism that can be used with the control mechanism of FIGS. 1–6;

FIG. 8 is a diagrammatic top plan view of a control mechanism constructed in accordance with a second embodiment of the present invention with a portion sectionalized for clarity;

FIG. 9 is a diagrammatic, fragmentary right side elevational view of the second embodiment control mechanism shown in FIG. 8;

FIG. 10 is a diagrammatic, top plan view of a steering selector apparatus constructed in accordance with a third embodiment of the present invention with a portion broken open to show details thereof; and FIG. 11 is a diagrammatic, elevational view of the steering selector appartatus of FIG. 10 as taken along line XI—XI thereof, with a portion broken open to better illustrate details thereof.

BEST MODE FOR CARRYING OUT THE INVENTION

Figure 1:
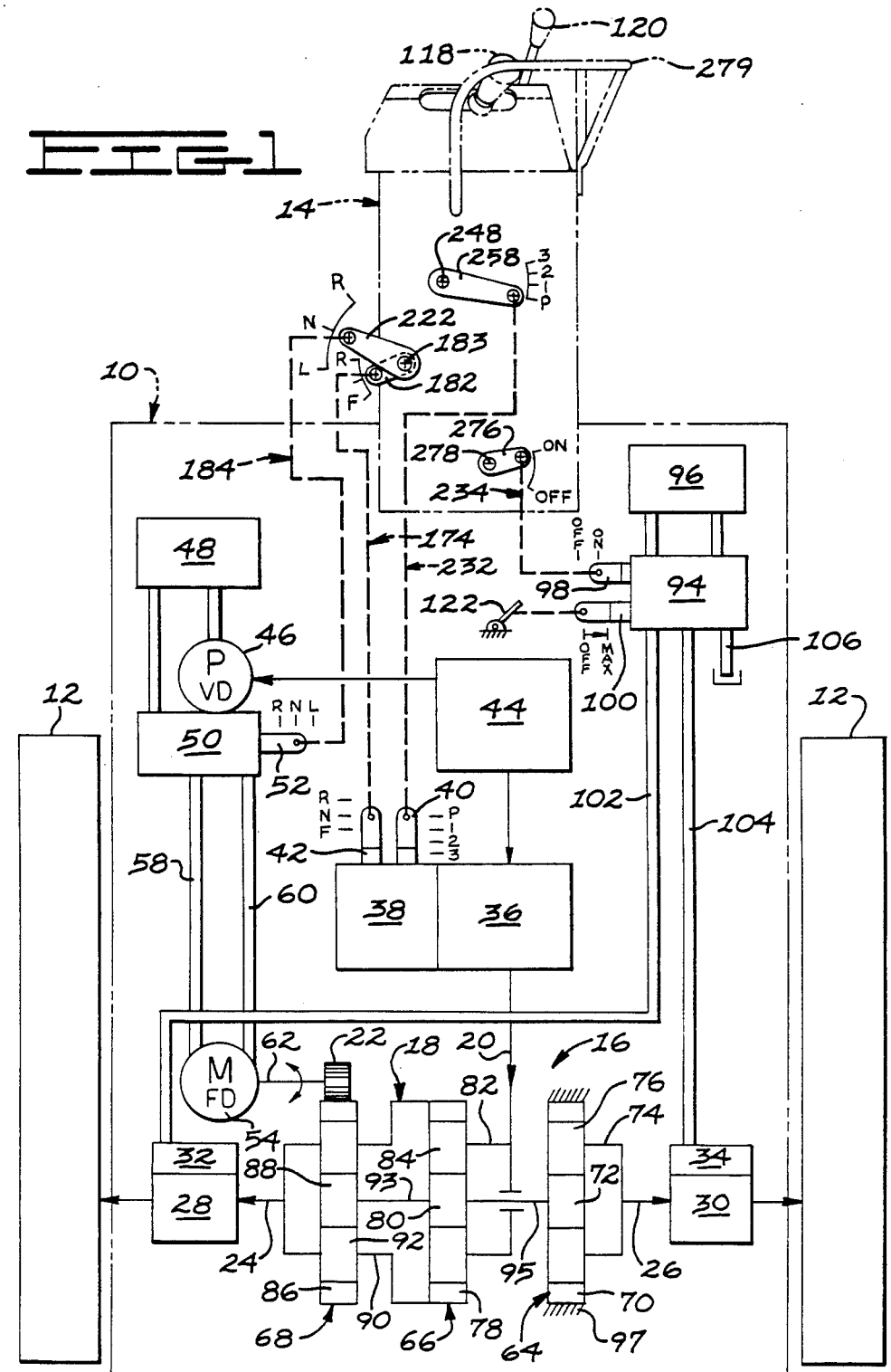
FIG. 1 is a diagrammatic top plan view of a tractor including a cross drive mechanism driven by a serially connected engine and transmission, a plurality of hydraulically actuated components in block diagram form for the control thereof, and a fragmentary and schematic right side elevational view of a control mechanism constructed in accordance with a first embodiment of the present invention for selectively positioning a plurality of spool elements associated with the operational controls of the tractor.

A tractor, as generally indicated by the reference numeral 10 in FIG. 1, includes a pair of endless track chains or endless belts 12 which are operated by a control mechanism 14 constructed in accordance with a first embodiment of the present invention in order to selectively propel the tractor as desired.

The tractor 10 has a cross drive mechanism or transaxle 16 employing a planetary steering differential 18. First and second input members 20,22 deliver power to the differential, and first and second output members 24,26 deliver power therefrom to left and right final drives 28,30. A left brake 32 and a right brake 34 are associated with the respective final drives so as to selectively stop movement of the track chains in the usual manner. During straight line movement of the tractor 10 the first input member 20 to the differential 18 is preferably driven by a power shift transmission 36 having a plurality of forward speeds and a plurality of reverse speeds. The transmission is operated by a suitable transmission control valve device 38 hydraulically actuated by a speed selector spool 40 having four axial positions and a directional selector spool 42 having three axial positions. The transmission and its associated control valve device are of conventional construction and need not be further described. An engine 44 of the usual type is effective to drive the transmission, and also to drive a variable displacement steering pump 46. The steering pump is connected to a fluid pressure source 48 and to a steering control valve device 50 having a steering selector spool 52 capable of being axially placed in a neutral position and an infinite number of left and right steering positions at either side thereof.

Operation of the steering pump 46 is effective to direct fluid to a fixed displacement steering motor 54 via either one of a pair of hydraulic lines 58,60. Thus, the steering motor can selectively rotate a shaft 62 in either direction of rotation through a preselected speed range from a stationary position. In this example, the shaft 62 rotates the second input member 22 to the differential 18—which is preferably a spur gear.

More specifically, the planetary steering differential 18 has first, second and third interconnected planetary mechanisms 64,66,68 as is diagrammatically illustrated. The first planetary mechanism 64 has a ring gear 70, a sun gear 72, a planet carrier 74 and a plurality of planet gears 76 rotatably mounted on the carrier and in engagement with the ring and sun gears. The second planetary mechanism 66 has a ring gear 78, a sun gear 80, a planet carrier 82 and a plurality of planet gears 84. Similarly, the third planetary mechanism 68 has a ring gear 86, a sun gear 88, a planet carrier 90 and a plurality of planet gears 92. In the embodiment illustrated the first input member 20 from the transmission 36 is connected to rotate the second planet carrier 82. Since the first, second and third sun gears 72, 80 and 88 are connected for joint rotation via intermediate shaft elements 93,95, and the first ring gear 70 is continuously held stationary with respect to a transaxle housing 97, the second ring gear 78 and second sun gear 80 are caused to be powerably rotated. The second ring gear 78 is connected to rotate jointly with the third planet carrier 90 and the first or left output member 24, and the first planet carrier 74 is connected to rotate jointly with the second or right output member 26.

If straight ahead operation of the tractor 10 is desired the steering motor shaft 62 and spur gear 22 are held stationary by operation of the control mechanism 14 as will be subsequently described, and this holds the third ring gear 86 stationary. Under these conditions the left and right differential output members 24,26 are simultaneously driven at the same speed and in the same direction, and at equal levels of torque.

If a steering correction is desired, the steering motor shaft 62 and spur gear 22 are rotated in the selected direction at the desired speed to cause the output members 24,26 to be driven at different speeds. This powerably rotates the left final drive 28 and left track chain 12 at a different speed than the right final drive 30 and right track chain 12 and results in a turning motion.

The left and right brakes 32,34 of the tractor 10 are spring engaged and hydraulically released. A brake control valve device 94 is connected to a fluid pressure source 96 and is selectively operated by a parking brake selector spool 98 or a separate service brake selector spool 100. While the parking brake selector spool 98 is basically an on-off two-position spool, the service brake selector spool 100 is an axially movable spool having a full range of modulating capability. The axial movement of either of these spools results in simultaneously and controllably opening a normally fully pressurized line 102 to the left brake 32 and a normally fully pressurized line 104 to the right brake 34 to a drain or reservoir 106. Subsequently the brakes will automatically be mechanically applied to controllably stop or retard the rotation of the respective final drives 28,30 to about the same degree in a well known manner.

In general, the manual manipulation of the control mechanism 14 by the left hand of the tractor operator is effective to control the axial displacement of the following elements: (a) the steering selector spool 52; (b) the directional selector spool 42; (c) the speed selector spool 40; and (d) the parking brake selector spool 98.

Figure 2:
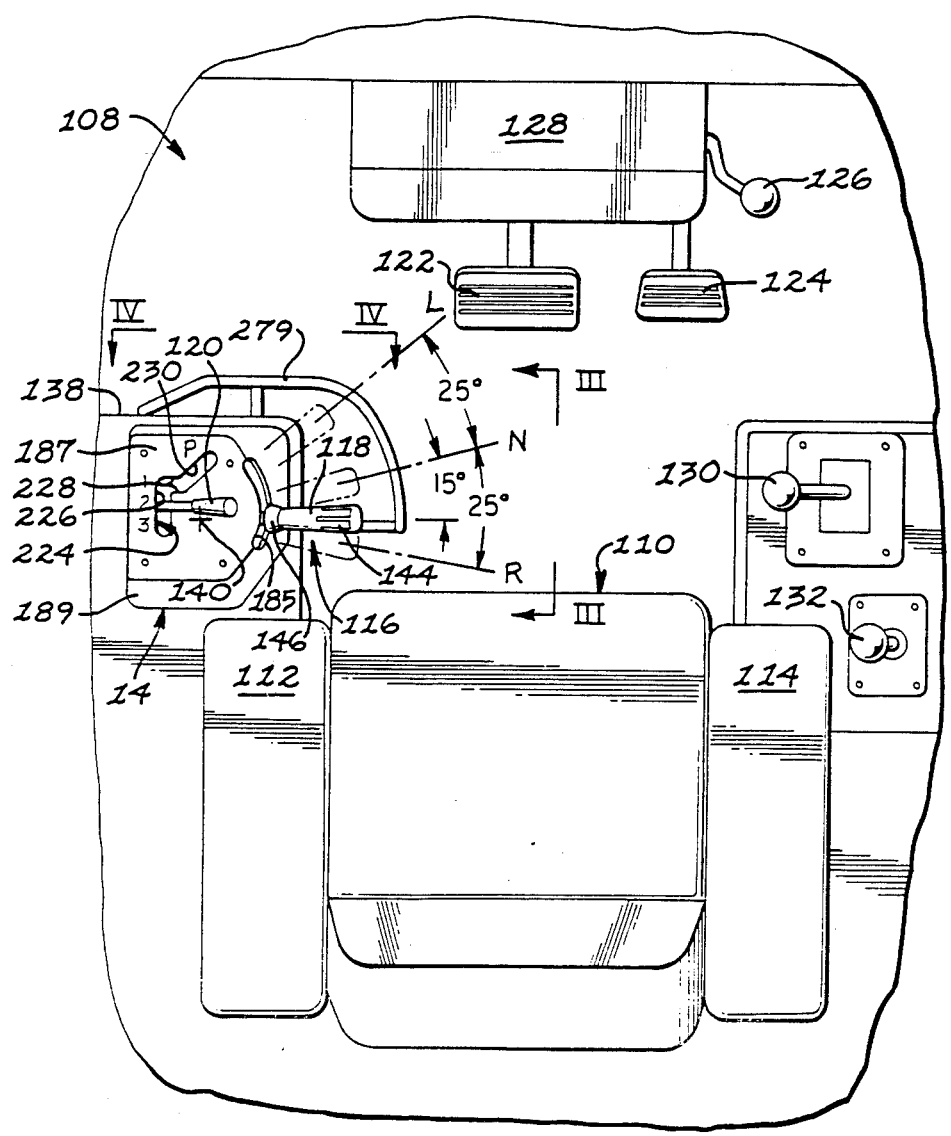
FIG. 2 is a fragmentary, diagrammatic, top plan view of the control mechanism illustrated in FIG. 1 including a portion of a tractor's operator station and various control elements in the vicinity of the tractor seat.

Referring to FIG. 2, a tractor operator station 108 is illustrated including a tractor seat 110 having left and right arm rests 112 and 114. Basically, the control mechanism 14 includes a steering selector apparatus 116 having a tiller arm 118, and a mechanically separated but juxtaposed speed selector lever 120 located generally immediately forwardly of the left arm rest 112. A first foot pedal 122 is located forwardly of the seat and, when it is depressed, is effective to controllably displace the service brake selector spool 100 shown in FIG. 1 and to thereby modulatably apply the tractor service brakes 32,34 in the usual manner. A second foot pedal 124 is located to the right of the first foot pedal and serves to controllably decelerate the engine 44 from a preselected higher engine speed setting as established by a hand operated engine throttle setting lever 126 pivotally connected to a forwardly located console 128. Thus, the depression of the second foot pedal 124 overrides the setting of the throttle setting lever and decreases the speed of the engine until it is released. Upon the release of the second foot pedal the engine speed returns to that established by the throttle setting lever also in a well known manner.

An implement control lever 130 and an auxiliary control lever 132 are located in juxtaposed positions near the right arm rest 114. The control lever 130, for example, can be of the joy-stick type and be used for adjusting not only the elevation of a bulldozer blade, but also the tilt angle thereof. The auxiliary control lever 132 can be used for operating a ripper or a winch mounted on the tractor. Although such implements are not shown in FIG. 2, the location and operation thereof are well known in the art.

Figure 3:
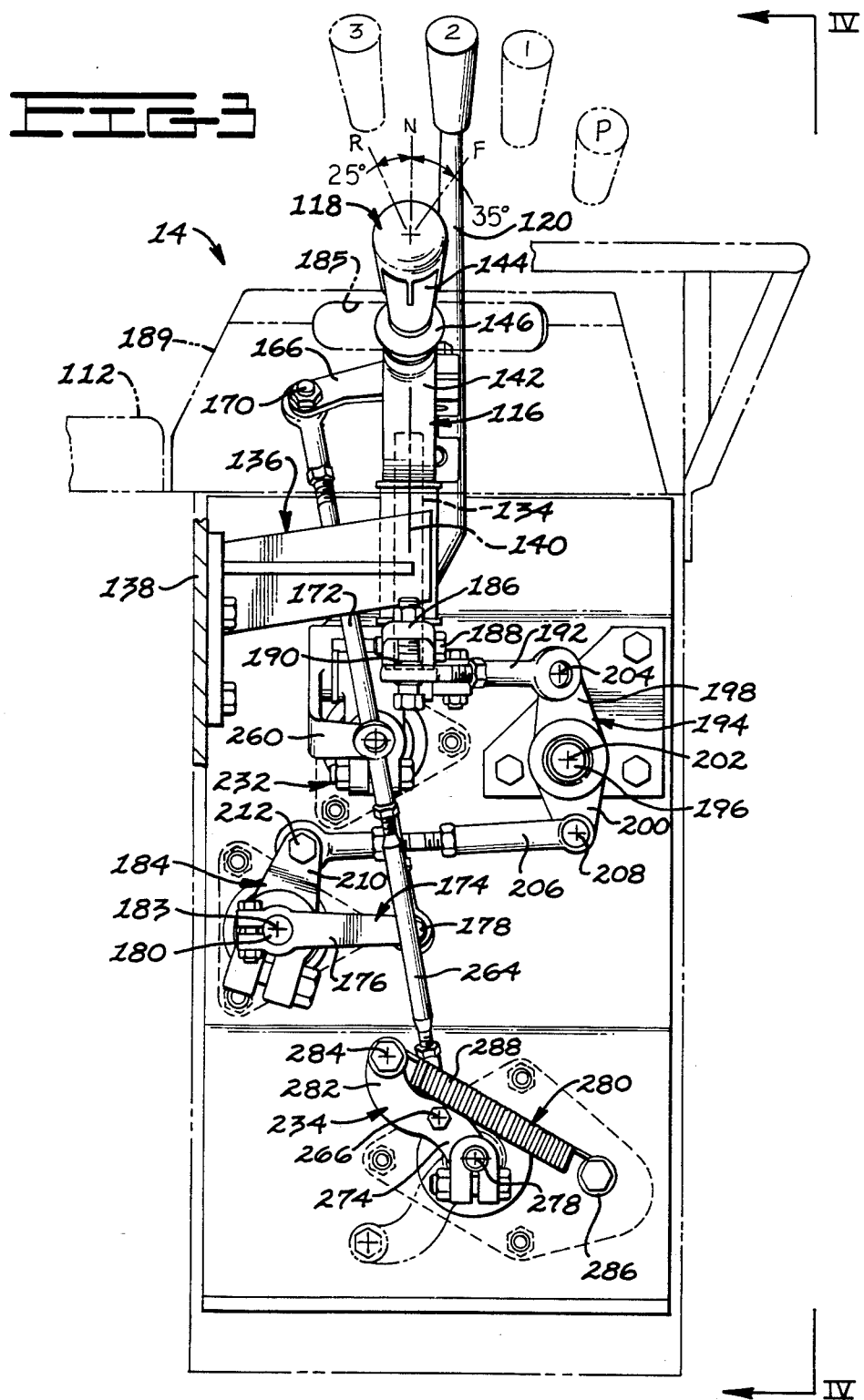
FIG. 3 is an enlarged, diagrammatic, right side elevational view of the control mechanism illustrated in FIG. 2 with the housing walls broken away to better shown details of the operating linkages associated therewith.
Figure 4:
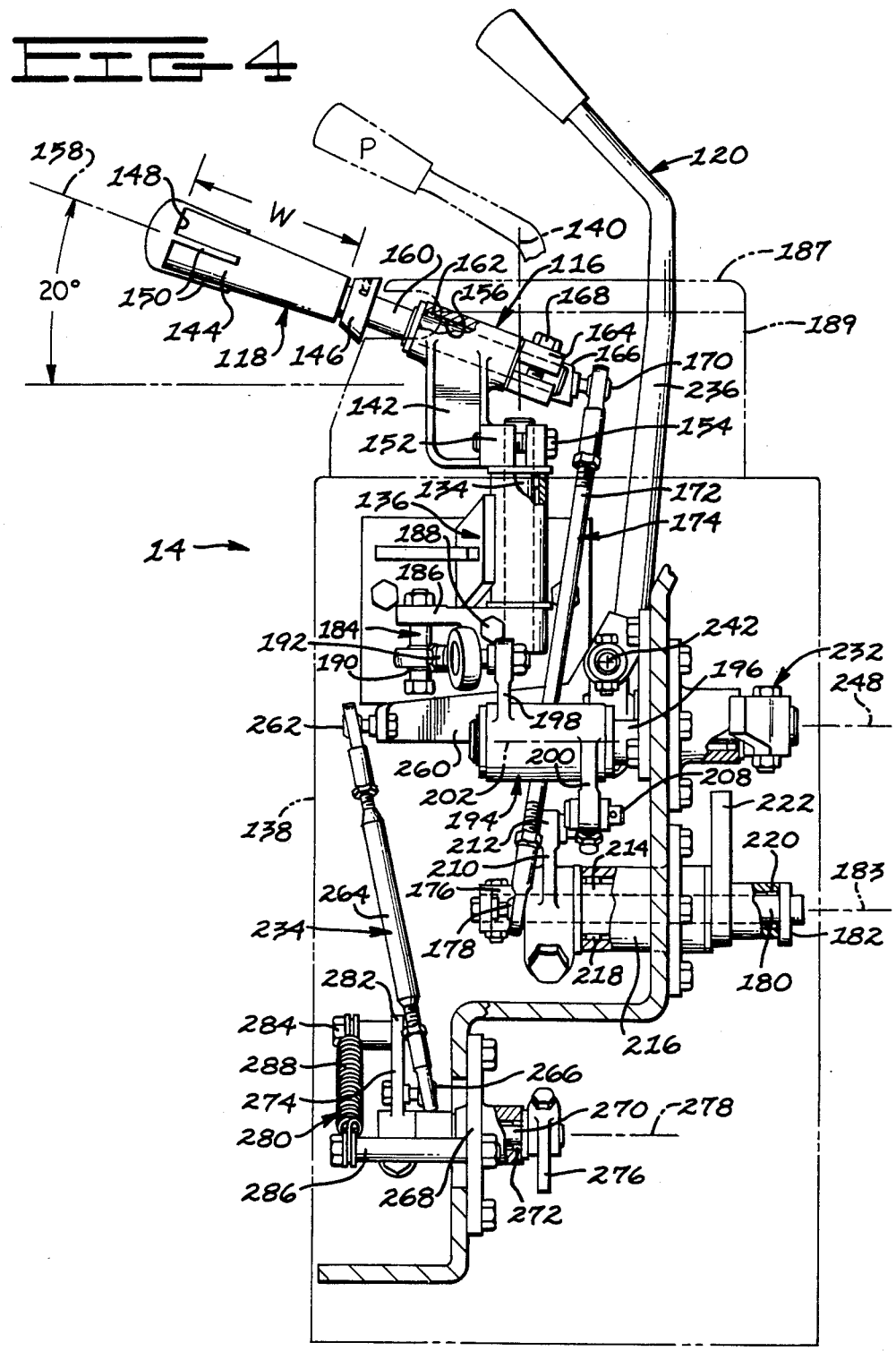
FIG. 4 is a diagrammatic, front elevational view of the control mechanism shown in FIG. 3 with the walls of the housing broken away.

Referring next to the control mechanism 14 shown in FIGS. 3 and 4, the steering selector apparatus 116 has an upstanding member or cylindrical post 134, and bearing support means or a support assembly 136 for pivotally connecting the post to a housing 138 for rotational movement solely about a fixed upstanding axis 140. The tiller arm 118 is connected to the post and extends outwardly therefrom and generally to the right when looking at FIG. 2, or when looking from the operator's seat 110. In the instant embodiment, the tiller arm includes a mounting portion 142, a hand grip portion or actuator 144 and an indicia portion 146 located generally therebetween.

As is shown in FIG. 4, the hand grip portion 144 is advantageously of a preselected width W sufficient for being conveniently grasped by the tractor operator's downwardly facing left hand palm. The hand grip portion is preferably spaced radially away from the upstanding and preferably vertical axis 140 about the same distance W in order to obtain a desirable degree of arm movement and relatively low degree of effort. The hand grip portion is preferably provided with an alternating plurality of longitudinally oriented depressions 148 and ridges or lands 150 for at least the radially outer portion thereof so that an operator can grasp it more positively.

The mounting portion 142 of the tiller arm 118 has a split socket 152 so that it can be releasably clamped to the top of the post 134 by the use of a screwthreadable fastener 154. A generally cylindrical chamber 156 is also defined in the mounting portion along an upwardly inclined steering arm axis 158. The radially outstanding steering arm axis is in the plane of the upstanding mounting axis 140 and is preferably inclined at an angle of about 20° with respect to a horizontal plane as is indicated in FIG. 4. A cylindrical stubshaft 160 on the hand grip portion 144 extends downwardly through the chamber 156 and sealed bearing means 162 is provided for rotatably supporting the stubshaft within the mounting portion. A split clamp 164 having a radially outwardly extending lever arm 166 is releasably secured to the distal end of the stubshaft by a screwthreadable fastener 168, and a ball and socket coupling joint 170 connects the lever arm to an adjustable length depending rod 172 forming a part of directional linkage means 174. As is illustrated in FIGS. 3 and 4 the lower end of the rod 172 is connected to a lever arm 176 by another ball and socket coupling joint 178. The lever arm 176 is releasably secured to a rotatable through shaft 180, and the through shaft has another lever arm 182 on the opposite end thereof. In this way when the hand grip portion 144 is rotated about the inclined axis 158 the last mentioned lever arm 182 is rotated about a transverse axis 183 of the through shaft 180. Referring temporarily to FIG. 1, the lever arm 182 is seen as being mechanically connected to the remainder of the directional linkage means 174 leading to the directional selector spool 42 for operation thereof as will be subsequently described. Since a plurality of conventionally interconnected links and levers can be used for connecting the lever arm 182 and the spool 42 only a phantom line directional linkage connection is illustrated in FIG. 1 for illustrative convenience.

Steering linkage means 184 is similarly utilized for appropriately coupling the rotational movement of the post 134 to the axial displacement of the steering selector spool 52. As shown in FIG. 2, the tiller arm 118 is swingable about the upstanding axis 140 and extends outwardly of the housing 138 via an arcuate slot 185 defined partly in a cover plate 187 and partly in a collar 189, and which slot opens outwardly toward the right side of the housing. This swinging movement causes corresponding movement of the post 134 and of the steering linkage means 184 illustrated in FIGS. 3 and 4.

The steering linkage means 184 includes a lever arm 186 releasably secured to the bottom of the post 134 by a fastener 188. A depending ball and socket coupling joint 190 is then used to connect a first adjustable rod 192 to the distal end of the lever arm 186. A bellcrank 194 rotates about a central axis 202 on suitable bearing means, not shown, mounted on a stationary stubshaft 196 connected to the housing 138. The bellcrank has first and second radial arms 198 and 200 extending therefrom at laterally displaced points. The first radial arm 198 is connected to the output end of the first rod 192 by a ball and socket coupling joint 204, and the second radial arm 200 is connected to a second adjustable length rod 206 by a pivot pin 208. The distal end of the second rod 206 is connected to a lever arm 210 by a ball and socket coupling 212, and that lever arm is releasably secured to a tubular shaft 214 as shown in FIG. 4. A stationary tubular support 216 is connected to the housing, and outer sealed bearing means 218 supports the tubular shaft therewithin. Inner sealed bearing means 220 rotatably supports the through shaft 180 within the tubular shaft. An output lever arm 222 is rigidly secured to the tubular shaft and, as shown in FIG. 1, it is this output lever arm that subsequently causes proportioned movement of the remainder of the steering linkage means 184 to effect controlled displacement of the steering selector spool 52.

As shown in FIG. 2 a profiled slot 224 defined in the cover plate 187 of the housing 138 has a longitudinal portion 226, a transverse portion 228, and an oblique portion 230. As the speed selector lever 120 is manually displaced fully within the slot corresponding movement is effected of speed linkage means 232 and of brake linkage means 234 shown in FIGS. 1, 3 and 4.

Figure 5:
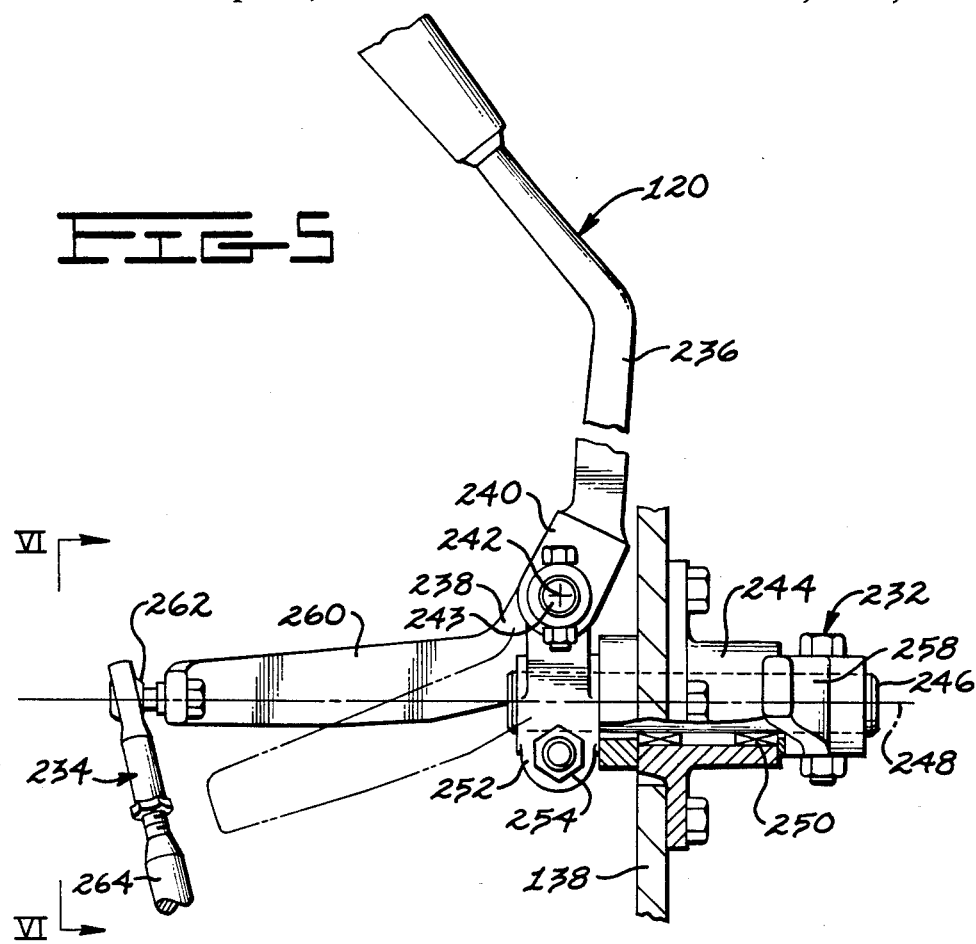
FIG. 5 is a fragmentary front elevational enlargement of the speed shift control lever illustrated in FIG. 4 showing the construction of the mounting joint thereof.
Figure 6:
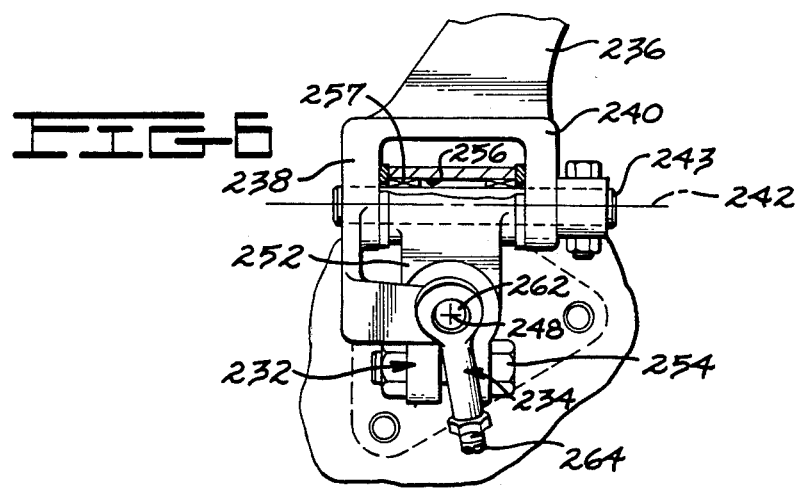
FIG. 6 is a fragmentary right side elevational enlargement of the mounting joint of FIG. 5.

As shown best in FIGS. 5 and 6, the speed selector lever 120 can be noted to include an upstanding shift cane 236, and juxtaposed first and second depending arms 238,240 defining a pair of openings therethrough on a longitudinally extending axis 242. A pivot pin 243 extends through the openings along the axis 242. A tubular support member 244 is releasably secured to the housing 138 and extends therethrough. A pivot shaft 246 is mounted within the support member for rotation about a transverse axis 248 by sealed bearing means 250, and a cast member 252 is releasably secured to the pivot shaft by a fastener 254. The cast member has a cylindrical bore 256 therethrough and bearing means 257 therein for receiving the pivot pin 243 and, hence, with solely longitudinal movement of the shift cane 236 about the axis 248, the cast member 252 and shaft 246 will be rotated jointly with the shift cane to cause corresponding movement of an output lever arm 258 secured to the distal end of the shaft 246. The rotation of output lever arm 258 subsequently controls the displacement of the speed selector spool 40 shown in FIG. 1 through the remainder of the speed linkage means 232.

The first arm 238 of the speed selector lever 120 has an extension 260 thereon and a ball coupling joint 262 secured thereto which is collinearly aligned with the axis 248 whenever the shift cane 236 is in the longitudinal portion 226 of the slot 224 illustrated in FIG. 2. An adjustable length brake rod 264 depends from the coupling joint 262 and is secured to another ball coupling joint 266 as shown in FIG. 4. A tubular support member 268 is secured to the housing 138 and a through shaft 270 is rotatably supported within it by sealed bearing means 272. A first lever arm 274 is secured to the inner end of the shaft 270 and the ball coupling joint 266 is transversely secured thereto. A second or output lever arm 276 is secured to the outer end of the shaft, so that with rotation thereof about a transverse axis 278 the remaining portion of the brake linkage means 234 is effectively positioned to displace the parking brake selector spool 98 shown in FIG. 1.

As shown in FIG. 2, a fabricated tubular guard 279 is releasably secured to the front and right sides of the housing 138 for protectingly preventing the speed selector lever 120 and tiller arm 118 from being inadvertently bumped into an operating mode by the operator when he is entering or exiting the region of the seat 110.

As is illustrated in the lower portions of FIGS. 3 and 4, an overcenter spring biasing mechanism 280 is effective to continually urge the shift cane 236 toward the left side of the longitudinal portion 226 of the slot 224 shown in FIG. 2 or toward the right side of the oblique portion 230 of the slot. Specifically, the biasing mechanism 280 includes an extension 282 on the first lever arm 274 and a laterally extending pivot joint 284 thereon. A stationary pivot joint 286 is secured to the housing 138 and a coiled tension spring 288 of a preselected length is secured between the joints 284 and 286.

INDUSTRIAL APPLICABILITY

When the speed selector lever 120 is disposed toward the front of the oblique portion 230 of the slot 224 shown in FIG. 2 and thereby into park (P), the speed linkage means 232 is effective to rotate the output lever arm 258 about the transverse axis 248 to about a 10° downwardly inclined position when viewing FIG. 1. This displaces the speed linkage spool 40 outwardly to its maximum park position, whereupon the transmission control valve device 38 automatically places the transmission 36 in a neutral condition wherein there is no power delivery at the input member 20 to the cross drive mechanism 16. Simultaneously, the brake linkage means 234 rotates the output lever arm 276 about the transverse axis 278 to about a 15° upwardly inclined position when viewing FIG. 1. The diagramatically illustrated parking brake selector spool 98 is thereupon positioned in the brake-on mode of operation.

While the invention has been described with respect to the displacement of a plurality of axially movable valve spools 40,42,52,98 and 100 it is to be understood that a plurality of rotatable control valve elements of conventional construction having about the same incremental and correspondingly identified positions can be substituted therefor.

Desirably, the overcenter spring biasing mechanism 280 shown in FIGS. 3 and 4 is effective to hold the speed selector lever 120 positively in the park (P) position and to provide the proper "feel" to indicate that the brakes have been engaged. In the parking mode the extension 260 of the speed selector lever is rotated downwardly about the longitudinal axis 242 so that the coupling joint 262 is no longer aligned with the horizontal and stationary transverse axis 248 as can be appreciated by reference to the phantom line outline thereof shown in FIG. 5. The depending brake rod 264 is urged downwardly so that the first lever arm 274 and its integral extension 282 are rotated in a counterclockwise direction when viewing FIG. 3 to the phantom position illustrated. In the parking mode the spring 288 continually urges the first lever arm 274 in the counterclockwise direction, and this through the remainder of the brake linkage means 234 biases the speed selector lever at the cover plate 187 to the right when viewing FIG. 2.

The vehicle operator can move the speed selector lever 120 rearwardly and to the left within the oblique portion 230 of the profiled slot 224 against the decreasing resistance of the overcenter spring biasing mechanism 280. When the speed selector lever reaches the transverse portion 228 the depending brake rod 264 illustrated in FIG. 3 is raised sufficiently to align the pivot joints 284 and 286 at the spring biasing mechanism 280 with the axis 278. Any further upward movement of the brake rod will cause the spring 288 to go overcenter beyond that aligned position such that the lever arm 274 and extension 282 are thereafter continually biased in the clockwise direction. This aids operator movement of the speed selector lever into the longitudinal portion 226 of the profiled slot. Significantly, the profiled slot with its transverse portion 228 is so constructed as to prevent inadvertent downshifting beyond the first speed position because the spring biasing mechanism holds the speed selector lever to the left.

In the first speed position of the speed selector lever 120, identified on the cover plate 187 of FIG. 2, the tractor 10 can be roaded by twisting the hand grip portion 144 from a centered neutral mode of operation either to the forward position or to the reverse position. If the operator's left hand is rocked so that his fingers go down the letter "F" on the indicia portion 146 of the tiller arm 118 is elevated to the top and the tractor goes forward in first gear. Alternatively, rocking the wrist backward will cause the rotation of the twist grip portion to elevate the letter "R" to the top and cause reverse motion in first gear. This is a very effective and convenient motion, and requires an effort of only about 1.4 N·m (1.0 lb·ft) and a rotation of the twist grip portion from the neutral or "N" position of only about 35° to the forward position and 25° to the reverse position as is diagramatically shown in FIG. 3. Note that the travel distance required of the operator's wrist is unequal. This was incorporated in the instant embodiment because the natural motion of the wrist is more limited in the "backward" twist direction than in the "forward" twist direction, and is intended to avoid as much as possible regripping of the twist grip portion 144 when changing from forward to reverse as is frequently required.

Turning now to the directional linkage means 174 operated by the twist grip portion 144, and shown best in FIG. 3, the movement of the twist grip portion to the forward position will cause the lever arm 166 to be elevated. This raises the rod 172 and the lever arm 176 connected thereto, and lowers the distal end of the lever arm 182 so that it is downwardly inclined at an angle of about 42° with respect to a horizontal plane as is illustrated in FIG. 1. Thereupon the remainder of the direction linkage means 174 forces the directional selector spool 42 fully inwardly to the forward mode. It can be appreciated that backward twisting of the wrist for reverse will cause the directional selector spool to be pulled fully outwardly through these same elements. However, the distance that the directional selector spool travels from neutral is the same at the transmission control valve device 38.

Assuming next that in the first speed forward mode of operation that a left turn is desired. Under these conditions the tractor operator pushes on the tiller arm 118 shown in FIG. 2 with a relatively low force of about 31N (7 lb.) to initiate motion and to urge it forwardly a preselected angular distance from the neutral position illustrated in phantom and identified by the letter "N". Advantageously, the neutral or straight-ahead position is located at an angle of about 15° forward of a transverse vertical plane through the upstanding axis 140 of the tiller arm, or alternatively it extends outwardly toward a 2 o'clock position relative to a top plan view of the seat. Both the full left turn and full right turn positions, identified respectively by the phantom tiller arm line illustrations and the letters "L" and "R", are located at an angle of about 25° from the neutral position. The operator effort required at full turn is only about 47N (10.5 lb.). The steering arm axis 158 shown in FIG. 4 is inclined upwardly at about 20° for two reasons: firstly, such position is more comfortable than a horizontal tiller arm since it represents a more relaxed position of the forearm and wrist; and secondly, it allows the height of the housing 138 including the collar 189 and cover plate 187 to be minimal in this embodiment which is beneficial from both the appearance and cost standpoints.

In this embodiment of the control mechanism 14 the tiller arm 118 is placed inside or closer to the operator and elevationally below the handle or top of the speed selector lever 120. Note in FIG. 3, for example, that the tiller arm is located elevationally above the top of the left arm rest 112 at an optimized location relative to an operator's arm and downwardly facing hand palm. Raising the tiller arm would reduce operator comfort, while lowering it would cause the arm rest to interfere with the motion of the operator's arm.

In response to the forward movement of the tiller arm 118 away from the neutral position the lever arm 186 and first rod 192 of FIGS. 3 and 4 move forwardly. The second rod 206 of the steering linkage means 184 is subsequently moved rearwardly through the rotation of bellcrank 194 about axis 202. This rotates the lever arm 212 of FIG. 3 rearwardly and the output lever arm 222 of FIG. 1 downwardly away from neutral. In neutral the output lever arm 222 is upwardly inclined at about a 27° angle, in a full or maximum left turn position the output lever arm is slightly upwardly inclined at about 5°, and at a full right turn the output lever arm is upwardly inclined at about 55°. The remainder of the steering linkage means 184 not illustrated is effective to move the steering selector spool 52 outwardly of the pump control valve device 50 when a left turn is made or inwardly when a right turn is made as is indicated in FIG. 1. Such movement of the steering selector spool is in direct proportion to the movement of the tiller arm.

Thus the forward swinging movement of the tiller arm 118 actuates the pump control valve device 50, causes the steering pump 46 to modulatably direct fluid through one of the lines 58,60 to the steering motor 54, and to controllably rotate shaft 62 and second input member 22 in a first direction. Simultaneously, the first input member 20 is being controllably rotated in a first speed mode of operation. This causes the speed of the third planet carrier 90 and left output member 24 to be decreased to the same degree that the speed of the first planet carrier 74 and right output member 26 is increased. This results in a left turn whose degree is proportional to the amount that the tiller arm is pushed forwardly and the steering selector spool 52 is pulled outwardly of the pump control valve device. It should be kept in mind that the first and third planet carriers are driven at the same speed when the tiller arm 118 is in neutral and when the steering motor shaft 62 is held stationary.

Should a right turn be desired, the tiller arm 118 is pulled rearwardly and the steering selector spool 52 is subsequently urged inwardly within the pump control device 50 by the reverse action of the steering linkage means 184. This merely causes the steering pump shaft 62 to be controllably rotated in the opposite direction of the left turn.

A shift from first to second gear is accomplished by rearward movement of the speed selector lever 120. This is effective through the connecting speed linkage means 232 to pivotally raise the output lever arm 258 shown in FIG. 1 from about a 2° downwardly inclined position to a 5° upwardly inclined position, and subsequently result in the downward axial displacement of the speed selector spool 40 as is illustrated by the indicator markings. The transmission control valve device 38 then causes a first to second speed gear shift within the transmission 36 in the normal manner resulting in the second planet carrier 82 being rotated at a higher speed by the input member 20. A shift to third gear by further rearward movement of the speed selector lever moves the output lever arm 258 upwardly to a 12° upwardly inclined position and displaces the speed selector spool further inwardly in the transmission control valve device in a corresponding manner.

If the hand grip portion 144 is rotated backwardly by the operator during forward movement of the tractor 10 and with the tiller arm 118 pushed forwardly to achieve a left turn, then the tractor will make a relatively quick change in the travel direction to reverse. Moreover, the tractor will not traverse over the ground in the original arcuate path but rather will travel in a divergent arcuate path wherein the front of the tractor will continue to travel in the counterclockwise direction.

TILLER ARM CENTERING MECHANISM

The pump control valve device 50 shown in FIG. 1 can have an internal spring centering mechanism for the steering selector spool 52. As that spool is moved away from neutral the manual effort or force required can increase proportionately. This may not be enough to give the operator a proper "feel" or feedback at the tiller arm 118. Accordingly, it is contemplated that an external tiller arm centering mechanism 290 can be employed with the steering linkage means 184 as is diagramatically shown in FIG. 7. The lever arm 222 in the steering linkage means 184, for example, can be connected to the centering mechanism by an input rod assembly 294 at a pivot pin 296. A tubular sleeve 298 extends slideably through an opening 300 in the housing 138 and has a flange 301 integrally secured thereto, and an end plug 302 is screwthreadably secured to the sleeve such that an annular spring seat 304 is entrapped therebetween. Another spring seat 306 is displaced against the housing by an outer coiled compression spring 308 engaged against the spring seat 304. The rod assembly 294 includes a first rod 310 pivotally connected to the pin 296, and a second rod 312 screwthreadably connected to the first rod and having a head 314 at the distal end thereof. An inner coiled compression spring 316 is disposed between the first rod and the plug 302 within the sleeve.

In operation, the clockwise rotation of the lever arm 222 from the neutral position will compress the inner spring 316 against the plug 302 which cannot move to the right from the position shown because of the flange 301 contacting the housing. In that event the second rod 312 will be projected further outwardly of the plug. The length of the outer spring 308 doesn't change. On the other hand, the counterclockwise rotation thereof to the opposite steering direction will compress the outer spring 308 while the length of the inner spring doesn't change. In the latter event the leftward movement of the rod assembly 294 as a unit and the head 314 will cause the leftward movement of the sleeve 298 within the housing and the compression of the outer spring by corresponding movement of the spring seat 304.

SECOND EMBODIMENT

As shown by FIGS. 8 and 9, a second embodiment control mechanism 14' has a steering tiller arm 118' and a speed selector lever 120'. In this regard, elements of the second embodiment which are similar to those of the first embodiment are identified by the same reference characters, only with a prime indicator appended thereto.

The tiller arm 118' differs from the first embodiment by being located at a higher elevation relative to the left arm rest 112', and the speed selector lever 120' is now located below it. Moreover, the speed selector lever 120' is located to the right or toward the inside of the central pivot axis 140' of the tiller arm. Accordingly the operator's arm will be slightly more raised than the first embodiment during its natural position of rest of the downwardly facing hand palm on the grip portion 144'. But it is a natural motion for the operator's hand to drop down and slightly rearwardly in an arc and grasp the speed selector lever in order to move it longitudinally for a speed gear shift. Partly because of such relationship the axis 158' of the tiller arm is disposed in a horizontal plane rather than being at a slightly upwardly inclined angle. Such horizontal attitude simplifies the linkage and yet the more comfortable slightly angled position of an operators left hand can be accomplished by enlarging the diameter of the distal end of the hand grip portion 144' relative to the proximal end thereof.

A straight speed selection slot 318 in the housing 138' is longitudinally oriented with respect to the operator seat 110', but it is of note to recognize that the seat in this second embodiment is oriented at a preselected angle with respect to a longitudinally oriented plane of the tractor. Specifically, the seat, slot, and left arm rest 112' are inclined at about a 15° clockwise angle with respect to that plane as is indicated in FIG. 8. This inclination is often desirable so that the operator can more easily see the work implement being manipulated on the rear of the tractor.

Forward movement of the speed selector lever 120' will result in downshifting of the tractor from third, to second, and to first like the first embodiment as can be realized by reference to the indicia indicators on the housing 138'. However, upon reaching the forwardmost location it reaches a neutral (N) position rather than a park (P) position. With the second embodiment the transmission is neutralized, as before, but the service brakes are not simultaneously automatically applied. Although not illustrated, speed linkage means is actuated by movement of the speed selector lever 120' to correspondingly position a speed selector spool like spool 40 of the first embodiment.

The tiller arm 118' has a mounting portion 142' defining an enlarged end chamber 320 and a depending tubular portion 322. The hand grip portion 144' is pivotally mounted within the mounting portion by the bearing means 162' on the steering arm axis 158', but that axis is laterally offset from the central pivot axis 140' by a preselected distance "D" as shown in FIG. 8 in order to allow sufficient clearance for the output lever arm 166' to be rocked about the steering arm axis within the chamber. The distal end of the lever arm 166' is connected to a depending rod 172' through the ball and socket coupling joint 170' and is movable between the forward, neutral and reverse positions in a manner like that described with the first embodiment.

The depending tubular portion 322 of the tiller arm 118' is secured to a cylindrical tube or steering column 324 which is rotatably mounted to the housing 138' by eccentric cam locking collar bearing means 326 of conventional construction. When the tiller arm is pushed forwardly, for example, a lever arm 328 connected to the bottom of the steering column is rotated in a counterclockwise direction when viewing FIG. 8 about the fixed upstanding axis 140'. Although not illustrated, steering linkage means connected to the lever arm 328 is subsequently effective to move the steering selector spool 52 of the first embodiment.

It is contemplated further that conventional push-pull cables can be substituted for portions of the linkage means 174,184,232 and 234 for reasons of economy or for operational reasons such as being better able to arcuately connect spaced lever arms because of intervening mechanisms.

THIRD EMBODIMENT

Another construction of the steering tiller arm 118" incorporates rack and pinion linkage means 329 as is shown in FIGS. 10 and 11. Rotation of the hand grip portion 144" by the operator will cause the stubshaft 160" and a spur pinion gear 330 fixed thereto to be rotated about the steering arm axis 158" to achieve a directional change. The pinion gear is in intermeshing contact with a toothed rack 332 screwthreadably secured to the top of a rod 334 which serves the same function as the rods 172 and 172' previously described.

When the hand grip portion 144" is rocked forwardly the letter F on the indicia portion 146" is elevated into a position of alignment with an arrow 336 indicated a forward travel condition. This displaces the rod 334 upwardly and the remainder of the linkage means 174" not illustrated displaces the directional selector spool 42 substantially as described above.

In view of the foregoing it can be appreciated that the control mechanism 14 incorporates a conveniently manipulatable steering tiller arm 118—which tiller arm is so mounted as to be swingable immediately forwardly of an arm rest about a fixed upstanding axis 140. Thus, the hand grip portion 144 is disposed in a relatively stable position for movement in a single relatively shallow conical plane or a single horizontal plane so that an operator can grasp it almost continually in a comfortable manner forwardly and slightly above the left arm rest 112 during the normal work period. Significantly the effort required to make a turn is relatively low, yet generally proportional to the distance away from the straight-ahead or neutral position, because the hand grip portion 144 is spaced radially away from the upstanding axis 140 about one hand width (W). This is in marked contrast to the "joy-stick" control that is moved longitudinally for forward and reverse travel and laterally for steering to the left or right about a lower univeral joint. Moving the upstanding lever laterally and diagonally all day is particularly effort consuming and undesirable. Furthermore, that system employing forward and reverse movement of a T-shaped handle about a transverse axis for a directional change, coupled with the unnatural twisting required of that handle for steering would also be unsatisfactory because of operator fatigue. On the other hand, the operator of the instant control mechanism 14 can make a directional change by simply rocking his wrist forwardly or backwardly in the comfortable forwardly extending arm position to align the hand grip portion 144 with the selected indicia portion 146 and fully taking into account the principles of motion economy.

Not only is the steering selector apparatus 116 of the present invention properly constructed and arranged, but also it is clear from the above description and accompanying drawings that it can be advantageously used with a juxtaposed speed selector lever 120 so as to provide a very useful control mechanism for operation of a tractor. For example, it is a convenient and natural motion for an operator's hand to travel from the normal tiller arm position to the more infrequently used handle of the speed selector lever.

Other aspects, objects and advantages will become apparent from a study of the specification, drawings and appended claims.

We claim:

1. A control mechanism for operating a tractor having an operators seat, comprising:
    a steering selector apparatus including an upstanding member and a tiller arm connected to and extending outwardly from the upstanding member, the tiller arm having a mounting portion and a handgrip portion, the handgrip portion having a first axis and being supported on the mounting portion for rotation about the first axis;
    support means for connecting the upstanding member to the tractor for rotational movement solely about a fixed upstanding second axis;
    first control means for steering the tractor in response to swinging movement of the tiller arm from a central position wherein the handgrip portion extends generally laterally to a forwardly located position steering the tractor in one direction and to a rearwardly located position steering the tractor in the other direction; and
    second control means for selectively changing at least one of the speed of the tractor and the direction of the tractor in response to rotational movement of the handgrip portion about the first axis.

2. The control mechanism of claim 1 wherein the handgrip portion of the tiller arm extends generally radially outwardly from the second axis toward the right relative to the operators seat and generally upwardly from the mounting portion and the upstanding member.

3. The control mechanism of claim 1 wherein the first axis extends upwardly at a preselected angle with respect to a horizontal plane.

4. The control mechanism (14) of claim 3 wherein the preselected angle is about 20°.

5. The control mechanism of claim 1 wherein the first axis extends generally outwardly toward the right from the upstanding member and forwardly at a preselected angle with respect to a transverse vertical plane through the fixed upstanding second axis when the tiller arm is in the central position thereof.

6. The control mechanism of claim 5 wherein the forwardly and rearwardly located positions of the tiller arm (118) are disposed at about the same preselected angle from the central position.

7. The control mechanism (14) of claim 5 wherein the preselected angle is about 25°.

8. The control mechanism of claim 1 wherein the operators seat has an arm rest and the tiller arm is disposed elevationally above the arm rest.

9. The control mechanism of claim 8 wherein the handgrip portion of the tiller arm extends generally toward the right as viewed from the operators seat.

10. The control mechanism (14) of claim 9 wherein the tiller arm (118) in its central position extends outwardly toward a 2 o'clock position relative to a top plan view of the seat (110).

11. The control mechanism (14) of claim 1 wherein the steering selector apparatus (116) includes means (290) for biasing the tiller arm (118) to its central position and requiring operator effort generally proportionate to its distance away from the central position.

12. The control mechanism of claim 1 wherein the first control means includes a steering motor and means for controllably directing a fluid to the steering motor and operating the steering motor in direct proportion to the swinging movement of the tiller arm away from the central position in either direction.

13. The control mechanism of claim 1 wherein the first control means includes a control valve device and a steering selector spool, and the steering selector apparatus includes steering linkage means for operatively connecting the upstanding member to the steering selector spool for operation of the control valve device.

14. The control mechanism of claim 1 wherein the tractor has a transmission, and the second control means includes means for neutralizing the transmission in response to rotation of the handgrip portion about the first axis to a preselected disposition.

15. The control mechanism of claim 1 wherein the handgrip portion can be rotatably placed in a central position, and forward and reverse drive establishing positions at either side thereof.

16. The control mechanism of claim 1 wherein the second control means includes a directional selector spool and linkage means for connecting the handgrip portion to the directional selector spool and effecting corresponding movement thereof.

17. The control mechanism of claim 1 including a speed selector lever located adjacent the tiller arm, third control means for making a transmission speed selection, and linkage means for connecting the speed selector lever to the third control means for operation thereof.

18. The control mechanism of claim 1 including an upstanding speed selector lever and second support means for connecting the speed selector lever to the tractor adjacent the tiller arm.

19. The control mechanism of claim 18 wherein the second support means positions the speed selector lever for generally longitudinal movement to the left of the upstanding second axis relative to the operators seat.

20. The control mechanism of claim 19 wherein the speed selector level has a handle disposed elevationally above the handgrip portion of the tiller arm.

21. The control mechanism of claim 18 wherein speed selector level is positioned for generally longitudinal movement to the right of the upstanding second axis relative to the operators seat.

22. The control mechanism of claim 21 wherein the speed selector lever has a handle disposed elevationally below the handgrip portion of the tiller arm.

23. The control mechanism of claim 1 wherein the tractor has a housing defining an arcuate slot through which the tiller arm extends.

24. The control mechanism (14) of claim 1 wherein the hand grip portion (144) includes a stubshaft (160) extending for pivotal movement through the mounting portion (142) and having a lever arm (166) at the distal end thereof.

25. The control mechanism (14) of claim 1 wherein the hand grip portion (144") is connected to rack and pinion linkage means (329) for making a directional change in response to rotational movement of the hand grip portion (144") on the mounting portion (142").

26. The control mechanism (14) of claim 1 including brake means (32,34) for stopping movement of the tractor (10), an upstanding speed selector lever (120) located adjacent the tiller arm (118) and having a park position, and linkage and control means (234,98,94) for automatically engaging the brake means (32,34) in response to movement of the speed selector lever (120) to the park position.

27. A control mechanism for operating a tractor including a transmission having a plurality of operating conditions, comprising:
  a steering selector apparatus including a tiller arm having a mounting portion and a handgrip portion, the steering selector apparatus being mounted on the tractor so that the tiller arm is swingable solely about a fixed upstanding axis with the handgrip portion extending generally laterally in a central position of the tiller arm;
  first control means for steering the tractor in response to swinging movement of the tiller arm about the upstanding axis in either direction away from the central position; and
  second control means for selectively effecting a change in the operating condition of the transmission in response to rotational movement of the handgrip portion on the mounting portion of the tiller arm.

28. The control mechanism of claim 27 wherein the first control means includes a steering selector valve spool, and the steering selector apparatus includes linkage means for connecting the tiller arm operatively to the steering selector valve spool for controlled movement thereof.

29. The control mechanism of claim 28 wherein the second control means includes a directional selector valve spool and directional linkage means for connecting the handgrip portion to the directional selector valve spool for controlled movement thereof.

30. A control mechanism for operating a vehicle including a transmission having a plurality of operating conditions, comprising:

a first member mounted on the vehicle for swinging movement about a fixed upstanding axis in opposite directions away from a central portion;

steering means for steering the vehicle in response to swinging movement of the first member;

a second member rotatably mounted on and adaptable to swing the first member by being manually grasped; and transmission means for effecting a change in the operating condition of the tractor in response to rotary movement of the second member.

31. The control mechanism of claim 30 wherein the vehicle includes an operators seat having an arm rest, and the second member includes a handgrip portion arranged generally immediately forwardly of and elevationally above the arm rest and having a preselected width sufficient for being conveniently grasped by an operators downwardly facing hand palm.

32. The control mechanism of claim 31 wherein the handgrip portion has a second axis extending radially outwardly from the first member toward the right relative to the operators seat and upwardly at a preselected angle with respect to a horizontal plane.

33. The control mechanism of claim 30 wherein the transmission means includes first means for moving the vehicle forwardly, second means for neutralizing the transmission, and third means for moving the vehicle rearwardly in response to rotation of the second member.

34. The control mechanism of claim 33 including an upstanding speed selector lever mounted on the vehicle adjacent the first and second members for generally longitudinal movement, and control means for connecting the speed selector lever to the transmission for effecting a speed change thereof.

35. A control mechanism for operating a tractor including a transmission and a cross drive mechanism having a steering motor and an opposite pair of output members, comprising:

first means for steering the tractor by operating the steering motor in either direction of rotation and driving the output members at different rates of speed to effect a turn, the first means including a first control member swingable about a fixed upstanding axis; and second means for changing the travel direction of the tractor by reversing the transmission, the second means including a second control member mounted on the first control member and being movable thereon between forward and reverse drive establishing positions.

36. The control mechanism of claim 35 including third means for changing the speed of the tractor by shifting the transmission, the third means including a third control member disposed adjacent the second member and being generally longitudinally movable.

* * * * *